UNITED STATES PATENT OFFICE.

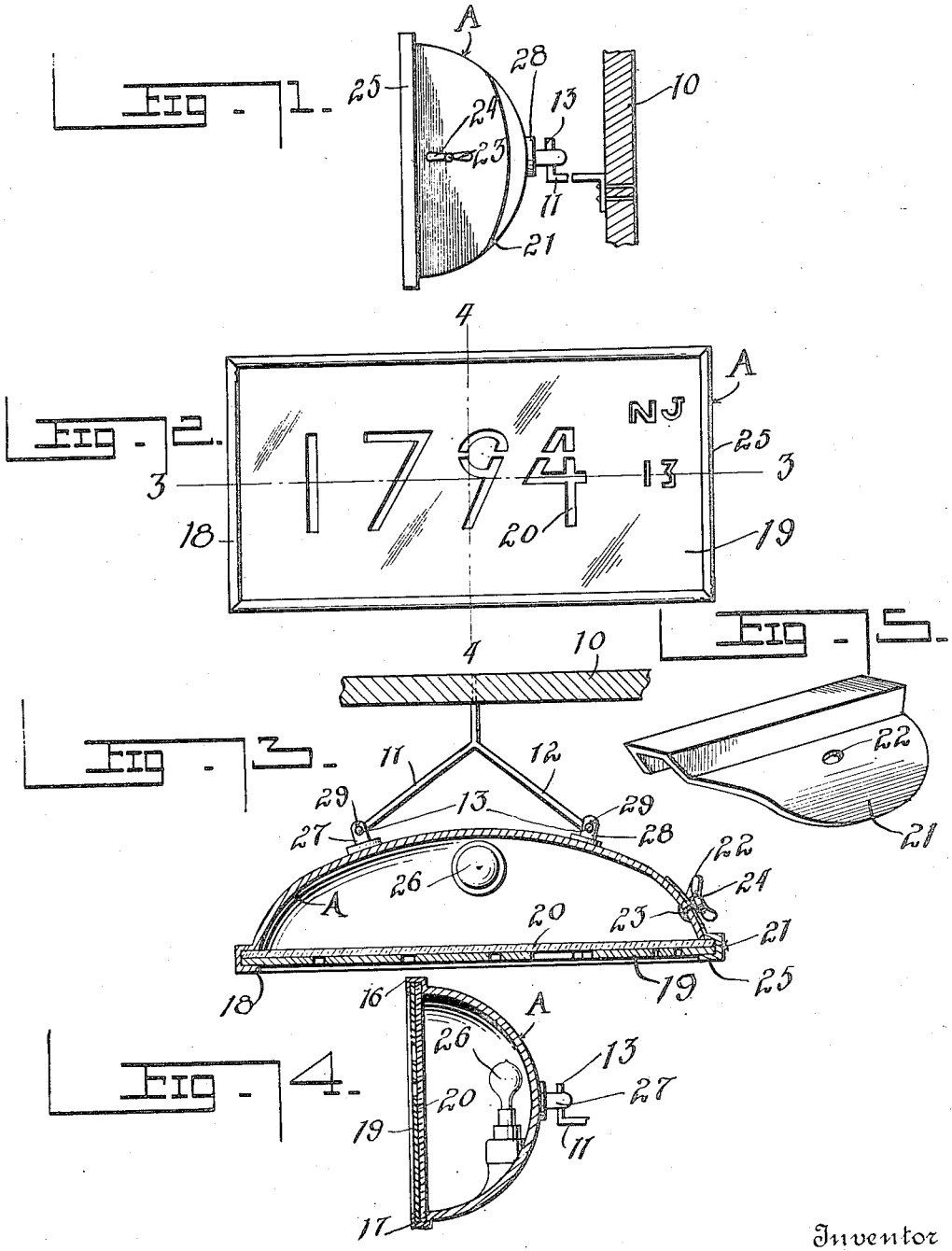

DOMENICK GENTILE, OF JERSEY CITY HEIGHTS, NEW JERSEY.

LICENSE-NUMBER ILLUMINATOR.

1,103,873.  Specification of Letters Patent. Patented July 14, 1914.

Application filed April 2, 1913. Serial No. 758,352.

*To all whom it may concern:*

Be it known that I, DOMENICK GENTILE, a citizen of the United States, residing at Jersey City Heights, in the county of Hudson, State of New Jersey, have invented certain new and useful Improvements in License-Number Illuminators; and I do hereby declare the following to be a full, clear, and exact description of the invention, such as will enable others skilled in the art to which it appertains to make and use the same.

This invention relates to devices for holding and illuminating the license numbers of automobiles.

The object of the invention resides in the provision of a device of the character named which will be simple in construction, easily associated with an automobile and which may be manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of the device, same being shown attached to an automobile frame; Fig. 2, a front elevation of the device disclosing the number plate; Fig. 3, a section on the line 3—3 of Fig. 2; Fig. 4, a section on the line 4—4 of Fig. 2, and Fig. 5, a detail perspective view of the locking plate of the device detached.

Referring to the drawings 10 indicates a part of the automobile frame to which is secured a bracket including diverging arms 11 and 12 the free ends of which terminate respectively in upturned portions 13.

The device proper includes a casing A having an open front end. The horizontal edges of the wall of the casing A terminate at the open end of said casing in portions 16 and 17 having U-shaped cross sections, while one of the vertical edges of said wall terminates in a portion 18 of U-shaped cross section, said portions 16, 17 and 18 forming grooves for the reception of a number plate 19 and a color plate 20 which is disposed at the rear of the number plate 19. The ends of the portions 16 and 17 remote from the portions 18 are beveled for a purpose that will presently appear. The numbers on the plate 19 are formed by cutting openings in the plate of the shape of the desired numbers. The number plate 19 and the color plate 20 are held in position across the open end of the casing A by means of a securing plate 21. This plate lies against one end of the casing A and conforms to the shape of the latter. The plate 21 is provided with an opening 22 through which extends a screw 23 mounted in one end of the wall of the casing A. Threaded on the screw 23 is a wing nut 24 which may be operated to positively secure the plate 21 to the casing A as will be obvious. The end of the plate 21 adjacent the open end of the casing A terminates in a portion 25 having a U-shaped cross section and which receives the adjacent end of the number plate 19 and the color plate 20 and in this manner secures said number plate and color plate against disengagement from their positions across the open end of the casing A. The ends of the portion 25 are beveled so as to properly mate with the beveled ends of the portions 16 and 17 when the plate 21 is in assembled position. Disposed within the casing A is a lamp 26 which when lighted will outline the numbers cut from the plate 19 in the color of the plate 20. Mounted upon the rear of the casing A are spaced brackets 27 and 28 provided respectively with openings 29 through which are engaged the upturned ends 13 of the supporting bracket and whereby the casing A is properly supported in position with respect to the automobile.

It will be noted that when a red color plate 20 is employed the use of a rear light on the automobile is rendered unnecessary as the red numbers illuminated by the device will take the place and serve all the legal requirements of the usual red rear light.

The device is so constructed that the number plate indicating the license in one State can be easily removed and the number plate indicating the license in another State substituted without disturbing any of the remaining parts of the device, it being only necessary to remove the plate 21 to permit the substitution of a plate indicating another license.

What I claim is:—

A license number illuminator and holder comprising a casing having an open side, the horizontal edge portions and one vertical edge portion of the casing having a U-shaped cross section to form grooves, a light-pervious numbered plate and a color plate disposed at the rear of the number plate both removably received in said grooves, the ends of the horizontal edge portions adjacent the other vertical edge of the casing being beveled, a locking member comprising a plate detachably fitted against the end of the casing adjacent said beveled ends of the horizontal edge portions, a screw mounted in said end of the casing and extending through an opening in the plate, a nut on said screw for binding the plate to the casing, the end of said plate adjacent the open end of said casing having a U-shaped cross section to form a groove for receiving corresponding ends of the number plate and color plate, the terminals of said end of the locking member being beveled to mate with the beveled ends of the horizontal edge portions of the casing, and a lamp in said casing.

In testimony whereof, I affix my signature, in the presence of two witnesses.

DOMENICK GENTILE.

Witnesses:
 WILLIAM SMITH,
 JOHN HEFLICH, Jr.